United States Patent Office 2,769,363
Patented Nov. 6, 1956

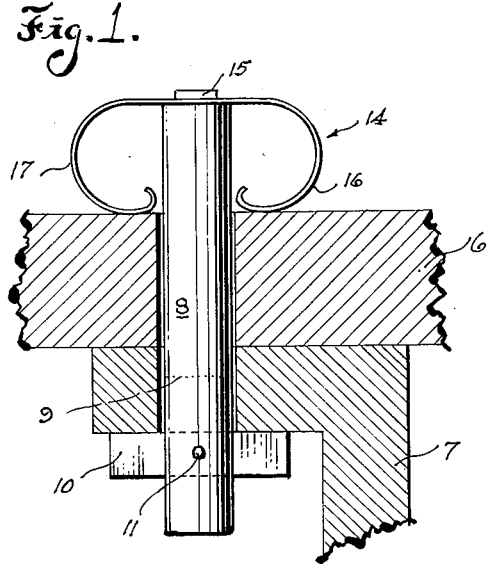
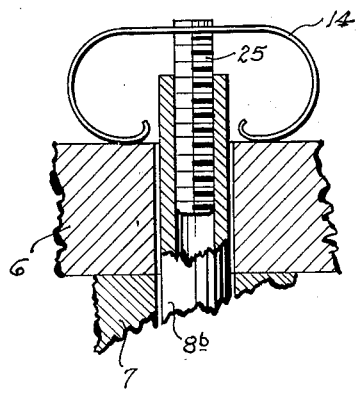
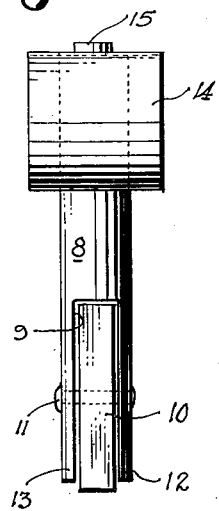
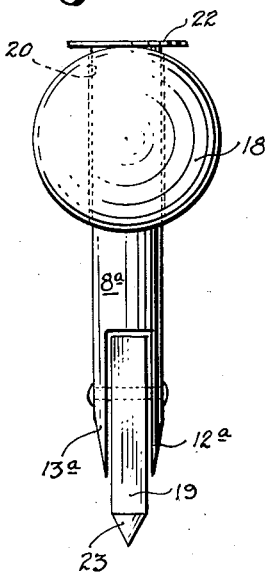
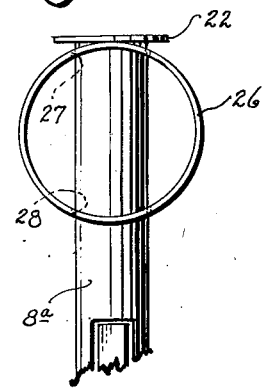
INVENTOR.
Alonzo B. Kight

2,769,363

PIVOTED LOCKING BAR FASTENER HAVING C-SHAPED SPRING HEAD

Alonzo B. Kight, Evanston, Ill.

Application November 7, 1951, Serial No. 255,151

3 Claims. (Cl. 85—3)

This invention relates to fasteners, and more particularly to a resilient fastener or clip for securing articles of relatively thin cross section together.

It is well known to provide fastening devices such as cotter pins for removably securing two or more articles together, or to serve as a stop member at the end of a shaft. In general, such devices require tools for installation or for removal, and while they may be bent to provide an initially secure connection, eventually tend to work loose.

An object of this invention is to provide a fastener of simple and efficient construction and one which may be readily inserted in or removed from the article or articles to be secured without the use of tools.

A further object of this invention is to provide an improved fastener which will not accidentally work loose in use due to vibration, shock or other similar causes.

A further object of this invention is to provide a fastener for resiliently securing two or more articles together.

A further object of this invention is to provide an improved fastener or support suitable for hanging an article such as a picture on a wall.

In accordance with one embodiment of the invention, a fastener may be provided comprising an elongated stem, having one end bifurcated, and a bar-like locking member pivotally mounted between the legs forming the bifurcated portion. At the opposite end of the stem there is provided a resilient head which, when the fastener is assembled in fastening relation, cooperates with the pivotable locking member to provide a resilient connection.

Other objects and advantages of this invention will be apparent from the following detailed description taken in conjunction with the drawings, wherein:

Fig. 1 is a partially sectional view illustrating one embodiment of the improved fastener of this invention holding a panel to a bracket;

Fig. 2 is an elevational view of the fastener shown in Fig. 1, the view being taken at right angles to the plane of the section illustrated in Fig. 1, and showing the transverse locking member pivoted into longitudinal alignment with the stem of the fastener;

Fig. 3 is a view similar to Fig. 2, showing a second embodiment of this invention wherein a spheroidal shaped resilient head is employed with a tapered locking bar and stem; and Fig. 4 is a fragmentary sectional view similar to Fig. 1, but showing a third embodiment of this invention wherein the resilient head is made both removable and adjustable;

Fig. 5 is a fragmentary view, similar to Fig. 4, showing a further modification of the resilient head.

In order to facilitate an understanding of the fastener of this invention, it has been illustrated as it is employed for securing a panel 6 to a bracket 7, the panel and bracket being shown fragmentarily. However, it will be understood that this showing is merely by way of example and indicative of only one application of this invention.

Referring to the drawings, it will be seen that the fastener of this invention comprises an elongated stem 8, the length of which is selected with reference to the thickness of the article or articles to be secured, it being contemplated that the fastener will be made in various sizes and have stems of various lengths. The lower end portion of the stem 8, as viewed in the drawing, is bifurcated, this lower portion having formed therein a generally rectangular recess or slot 9 which extends medially from the lower end thereof upwardly therefrom a suitable distance to receive a portion of a generally bar-shaped, pivotable locking member 10.

The locking member 10 is pivotably mounted on a pin or shaft 11 which extends transversely through suitable apertures formed in legs 12 and 13, forming the bifurcated lower portion of the stem 8. The locking member or bar 10 is selected to have a thickness such that when pivoted to longitudinal alignment with the stem, it is preferably no thicker in transverse section than the stem, as viewed in Fig. 1, so that any aperture into which the stem may be inserted will be sufficiently large to permit insertion of the locking member without difficulty. The width of the locking member is slightly less than the width of recess 9 so as to permit the locking member to pivot freely in the recess 9. The length of the locking member 10 is preferable sufficiently great so that when pivoted into locking position (transverse to the longitudinal axis of stem 8) the locking member will have a length greater than the diameter of the aperture in the article to be secured whereby the aperture may be bridged by the locking member.

In the embodiment illustrated in Fig. 1, the locking member 10 is pivotably mounted at its mid-point whereby either end portion may be pivoted into the recess 9 and into alignment with the stem 8. However, it will be apparent that the locking member may be mounted off center as illustrated for the locking member 19 in Fig. 3 whereby when the fastener stem is inserted in the article to be secured in a more or less horizontal plane, then when the locking member is exposed on the opposite side of the article, the longer portion will automatically drop and pivot the locking member to transverse or locking position.

Secured to the upper end of the stem, as viewed in Fig. 1, is a resilient head member 14, the member 14 being secured at its mid-portion to the upper end of the stem 8 by a rivet 15, or by other suitable means such as swaging the upper end of the stem. The resilient head member 14 illustrated in Figs. 1 and 2 may be formed from flat spring stock, and is generally C-shaped having a right arcuate portion 16, the end whereof remote from the head of the stem is bent inwardly toward the stem and a left arcuate portion 17, the end whereof remote from the head of the stem to which the member is attached is similarly inwardly turned. In Fig. 1, the spring member 14 is shown slightly compressed due to engagement with the upper surface of panel 6, whereas in Fig. 2 the spring member is free.

Instead of the spring member 14, a head 18 of generally spherical configuration, as illustrated in Fig. 3, may be employed, the head being formed of a suitable resilient material such as rubber, and being either hollow or solid. In the embodiment illustrated in Fig. 3, the head 18 is diametrically apertured as indicated at 20, to receive the upper portion of fastener stem 8a, the upper end of which is flanged, as indicated at 22, to provide a stop for the head 18. In assembling such a fastener, the head 18 is slipped over the stem from the lower end and pushed up to bear against the underside of flange 22. While a spherical configuration has been illustrated for the head 18, it will be understood that other configurations providing resilience and compressibility may be employed. The method of securing the head 18 to stem 21 may also be employed with the curved spring 14 of the embodiment illustrated in Figs. 1 and 2. In this manner resilient heads of different sizes and configurations may be employed to increase the range of adaptability of this fastener. In some applications it may be desirable in order to facilitate insertion of the fastener through the article or articles to be secured to taper one, or both ends of the locking bar. In Fig. 3 the longer end portion of the locking bar 19 has been tapered as indicated at 23 to facilitate piercing and at the same time the lower ends of legs 12a and 13a have been beveled inwardly to also facilitate piercing.

In Fig. 4 a further modification has been illustrated wherein the spring 14 is secured to a threaded member 25 which member 25 is threaded into a suitably internally threaded bore formed in the upper end of stem 8b. In this manner the compression of engagement may be adjusted and also the head may be readily removed where desired without removing the fastener. This embodiment is particularly suited for serving as a hook for hanging a picture or other article on a wall in combination with the tapered stem arrangement illustrated in Fig. 3 to permit driving the stem into the wall. By making the stem sufficiently long, the stem end may be made to protrude through the wall to permit the locking bar to drop into locking position, the fastener thus serving in much the same manner as a toggle bolt. Removal of the head eliminates the necessity of withdrawing the fastener when it is no longer to be used, the fastener being then driven into the wall sufficiently so that the hole so formed may be covered over.

In Fig. 5 a modified form of spring head has been illustrated comprising a circular band 26 retained on the stem 8a by flange 22 as illustrated in Fig. 3. The band is diametrically apertured at 27 and 28 to receive the stem 8a. It will be understood that a stem 8 and retaining head 15 such as illustrated in Fig. 1 or a stem 8b and retaining head 15b such as illustrated in Fig. 4 might well be employed in combination with the annular band 26 instead of the flanged head 22.

In employing the fastener of this invention, the locking member is pivoted into longitudinal alignment with the stem 8 and the stem inserted through the article or articles to be fastened. As illustrated in Fig. 1, the article may be a panel 6 which is to be secured to a bracket 7 and for convenience suitable holes may be formed in the panel and bracket, respectively, to receive the stem. Once the stem is inserted to the point at which the resilient head engages the outer side of the article, the stem is then pressed forward, for example, by thumb pressure against the outer end of the resilient head, to compress the resilient head and to permit the inner end of the pivotable locking member to be exposed. The locking member is then pivoted to transverse relation with the stem and the stem released, the resilient head then expanding to take up the slack. The article or articles so connected are then resiliently secured and will remain so connected despite subsequent vibration, shock or other similar forces.

From the foregoing, it will be apparent that the distance between the opposed faces of the locking member and of the resilient head is preferably related to the thickness of the article, or the combined thicknesses of the articles, to be secured. However, a substantial range of adaptability is afforded by the inherent resilience of the head and further adaptability afforded by making the heads interchangeable as illustrated in Fig. 3, for example.

While but four embodiments of this invention have been shown and described, it will be apparent that many changes and modifications may be made therein without departing from the spirit of the scope of this invention.

Where herein the various parts of this invention have been referred to as being located in a right or a left position or in an upper or lower position, it will be understood that this is done solely for the purpose of facilitating description and that such references relate only to the relative positions of the parts as shown in the drawings.

What is claimed is:

1. A fastener having an elongated stem with one end thereof provided with a locking bar, means mounting said locking bar for pivotal movement to a position substantially at right angles to the longitudinal axis of said stem and for pivotal movement to a second position wherein said locking bar is aligned with said stem: a head member defining a leaf spring having two oppositely extending terminal end portions joined by a central region, said central region being fixedly secured to an end of said stem remote from said locking bar, and the terminal end portions of said leaf spring being curved inwardly toward said stem and projecting axially of said stem in the direction of said locking bar, the terminal end portions of said spring being compressible toward said central region a distance at least as great as the difference in proximity between the nearest surface of said locking bar and said central regions in each of said two locking bar positions.

2. In a fastener having an elongated stem with one end thereof provided with a locking bar, means mounting said bar for pivotal movement to a position substantially at right angles to the longitudinal axis of said stem and being adapted for pivotal movement to a second position wherein said locking bar is aligned with said stem: a head member comprising spring means formed of flat spring stock to define a generally C-shape with the central region thereof being fixedly secured to an end of said stem remote from said locking member, and the terminal end portions of said leaf spring being curved inwardly and projecting axially of said stem toward said locking bar, the terminal end portions of said spring being compressible toward said central region a distance at least as great as the difference in proximity between the nearest surface of said locking bar and said central regions in each of said two locking bar positions.

3. A fastener comprising an elongated threadless bolt, the lower portion of said bolt being bifurcated to form two legs projecting axially of said bolt and defining therebetween a slot, a pivot pin in transverse relation to the axis of said bolt with the end portions thereof being carried by said legs and the intermediate portion thereof exposed in said slot, a locking bar pivotally mounted on said pin and confined within said slot and adapted to lock said bolt in place when desired, said locking bar when in transverse relation to the axis of said bolt, forming projections beyond the circumference of the bolt, a leaf spring fixedly secured to the end of said bolt opposite to the bifurcated end, and said leaf spring forming a convolution at each side of said bolt with the curved portions extending axially of said bolt toward the locking bar and toward the central regions of said bolt, the spring being compressible a distance at least as great as the difference in proximity between the nearest surface of said locking bar and the end of the bolt to which said spring is attached when said locking bar is in locking position and when said locking bar is pivoted from said locking position.

References Cited in the file of this patent

UNITED STATES PATENTS

| 196,914 | Lockwood | Nov. 6, 1877 |
| 231,334 | Kraus | Aug. 17, 1880 |
| 348,235 | Pope | Aug. 31, 1886 |
| 476,241 | Bouscaren | June 7, 1892 |
| 510,245 | Dorr | Dec. 5, 1893 |
| 513,182 | Grubb et al. | Jan. 23, 1894 |
| 743,211 | Alexander | Nov. 3, 1903 |
| 1,871,668 | Dawson | Aug. 16, 1932 |
| 2,246,834 | Bowman | June 24, 1941 |
| 2,476,561 | Pedersen | July 19, 1949 |
| 2,632,929 | Poupitch | Mar. 31, 1953 |

FOREIGN PATENTS

| 19,610 | Great Britain | Oct. 18, 1893 |